United States Patent
Honkura et al.

(10) Patent No.: US 6,917,132 B2
(45) Date of Patent: Jul. 12, 2005

(54) DC BRUSH MOTOR AND PERMANENT MAGNET USED THEREIN

(75) Inventors: Yoshinobu Honkura, Aichi-ken (JP); Yoji Hashimoto, Aichi-ken (JP); Hironari Mitarai, Aichi-ken (JP)

(73) Assignee: Aichi Steel Corporation, Tokai (JP)

( * ) Notice: Subject to any disclaimer, the term of this patent is extended or adjusted under 35 U.S.C. 154(b) by 165 days.

(21) Appl. No.: 10/315,194

(22) Filed: Dec. 10, 2002

(65) Prior Publication Data

US 2003/0111921 A1 Jun. 19, 2003

(30) Foreign Application Priority Data

Dec. 10, 2001 (JP) ........................................ 2001-375159
Sep. 20, 2002 (JP) ........................................ 2002-276194

(51) Int. Cl.[7] ........................ H02K 23/04; H02K 21/26; H02K 21/38
(52) U.S. Cl. ........................ 310/154.22; 310/151.12; 310/154.25; 310/156.12
(58) Field of Search ........................ 310/46, 454.12, 310/154.09, 156.01, 89, 154.22, 154.25, 156.12; 29/589, 596

(56) References Cited

U.S. PATENT DOCUMENTS

| | | | |
|---|---|---|---|
| 5,204,569 A | | 4/1993 | Hino et al. |
| 5,677,587 A | * | 10/1997 | Sakashita et al. ...... 310/154.28 |
| 5,691,681 A | | 11/1997 | Okugawa |
| 5,767,601 A | * | 6/1998 | Uchiyama .................... 310/190 |
| 5,886,070 A | | 3/1999 | Honkura et al. |
| 6,441,522 B1 | * | 8/2002 | Scott ...................... 310/156.23 |
| 6,444,052 B1 | | 9/2002 | Honkura et al. |
| 6,563,248 B2 | * | 5/2003 | Fujita ........................... 310/181 |
| 6,700,279 B1 | * | 3/2004 | Uchiyama et al. .......... 310/190 |

FOREIGN PATENT DOCUMENTS

| | | | |
|---|---|---|---|
| GB | 21933885 | * 6/1986 | ............ H02K/1/12 |
| GB | 2 193 385 | 2/1988 | |
| JP | 58-144565 | 8/1983 | |
| JP | 4-190646 | 7/1992 | |
| JP | 7-211567 | 8/1995 | |
| JP | 9-135547 | 5/1997 | |
| JP | 10-41115 | 2/1998 | |
| JP | 2816668 | 8/1998 | |
| JP | 11-186027 | 7/1999 | |
| JP | 3060104 | 4/2000 | |
| JP | 2001-7691 | 1/2001 | |
| JP | 2001-76917 | 3/2001 | |

* cited by examiner

*Primary Examiner*—Dang Le
*Assistant Examiner*—Heba Elkassabgi
(74) *Attorney, Agent, or Firm*—Oblon, Spivak, McClelland, Maier & Neustadt, P.C.

(57) ABSTRACT

The challenge to be solved by the present invention is the miniaturization of a 1-300 W class of motor. This can be achieved by using a hollow-cylinder shaped anisotropic bonded magnet magnetized in a 4-pole configuration. The anisotropic bonded magnet has a maximum energy product approximately 4 times greater than the conventional sintered ferrite magnets. The use of a 4-pole configuration shortens the magnetic path length of the individual magnetic circuits and the magnetic force contributing to the torque is increased. When the torque is kept the same as in the conventional motor, the length of the electromagnetic rotor core and the axial magnet length can be reduced. In this fashion, 1-300 W class motors can be reduced in size.

8 Claims, 10 Drawing Sheets

Relation between Performance Index and Number of Poles

FIG. 4

Effect on the motor performance index T of the parameter d/r

[Anisotropic bonded magnet (BH)max = 14 MGOe]

FIG. 5

Effect on the motor performance index T per unit amount of magnet used of the parameter d/r

[Anisotropic bonded magnet (BH)max = 14 MGOe]

FIG. 6

Effect on the motor performance index T of the parameter d/r

[Anisotropic bonded magnet (BH)max = 17 MGOe]

FIG. 7

Effect on the motor performance index T per unit amount of magnet used of the parameter d/r

[ Anisotropic bonded magnet (BH)max = 17 MGOe ]

FIG. 8

Effect on the motor performance index T of the parameter d/r

[Anisotropic bonded magnet (BH)max = 25 MGOe]

FIG. 9

Effect on the motor performance index T per unit amount of magnet used of the parameter d/r (Magnet efficiency S = motor performance index T / amount of magnet used)

[ Anisotropic bonded magnet (BH)max = 25 MGOe ]

DC BRUSH MOTOR AND PERMANENT MAGNET USED THEREIN

This is a patent application based on Japanese patent applications No. 2002-276194 and No. 2001-375159 which were filed on Sep. 20, 2002 and Dec. 10, 2001, respectively, and which are incorporated herein by reference.

BACKGROUND OF THE INVENTION

1. Field of the Invention

The present invention is related to a DC brush motor and a permanent magnet used within. In particular, the present invention is related to a DC brush motor and associated permanent magnet whose small size and high torque are made possible by the use of an anisotropic rare earth bonded magnet as the permanent magnet. The present invention is very effective for example in 1-300 W high-performance small-size DC brush motor applications.

2. Background Art

Prior to 1960, small-sized motors did not use magnets, but were induction brush motors. From 1960, with the appearance of affordable ferrite magnets with a maximum energy product (BHmax) on the order of 4 MGOe, small-sized brushless motors with a power consumption on the order of 1–300 W appeared, and have been used for the last 40 years. The configuration of these motors comprises 2-pole or 4-pole sintered ferrite magnets tiled on the inside perimeter of the housing, in the center of which is an electromagnetic rotor core wound with coils. When the motor is driven, the direction of the current flowing through the coils is changed via the brushes arranged on the rotational axis, and the Lorentz forces, which arise from the interaction between the current and the magnet field derived from the peripheral sintered ferrite magnets, induce rotation of the electromagnetic rotor core.

In recent years, there has been a demand for the miniaturization of such small-sized motors, however this has not been realized because sintered ferrite magnets with thin enough wall thickness cannot be manufactured due to the shrinkage of sintered ferrite magnets during sintering. Moreover, high-output motors could not be realized as sintered ferrite magnets have a low attractive force.

In addition, if one attempts to make a large-size motor in order to achieve high output, there is no alternative but to make a 4-pole motor, as the arc length is too great for a 2-pole motor. In this case of a 4-pole motor using sintered ferrite magnets, the size and weight are increased, and it is not possible to improve the motor performance index (torque constant/volume). Furthermore, as the shape of sintered ferrite magnets differs depending on the environmental conditions, such as humidity and the sintering conditions, it is difficult to achieve tiled sintered ferrite magnets of exactly the same dimensions. In addition, it is necessary to individually arrange said sintered ferrite magnets in said motor housing. Because of this, the problem of squeaking and rattling can occur due to uneven torque resulting from errors in symmetry of the magnetic field made during precision arrangement. In the latter part of the 1990's, an anisotropic bonded magnet with superior molding properties, and superior magnetic properties of a maximum energy product (BHmax) no less than 14 MGOe, or four times that of a ferrite magnet, appeared on the scene and investigation into its application to motors began.

However, these magnets were not adopted because when motor manufacturers simply tried to replace the ferrite magnets of conventional small-sized brush motors with these magnets having four times the maximum energy product, the motor properties only increased on the order of 20%, and because the back yoke needed to be doubled, the size actually increased. In addition, as the motor properties depend on several factors such as armature shape and properties, back yoke thickness and material, coils, etc., the increase in properties could only be expected to be on the order of 20% and therefore these magnets have not been adopted in recent years.

SUMMARY OF THE INVENTION

The purpose of the present invention is to solve the aforementioned problems that have long plagued the small-sized brush motor industry by either reducing the volume of the motor by ½ while maintaining the same properties of the conventional motor, thus greatly reducing size and weight, or by improving the motor properties twofold while reducing the volume by 20% compared to the conventional motor, thus greatly improving the properties.

In other words, a motor with high properties, such as twice the performance index T of the technological benchmark of the conventional motor using sintered ferrite, can be offered.

At the same time, by minimization of uneven torque, the quietness can be improved, and the process of gluing several magnets can be omitted from the manufacturing process.

Furthermore what is especially favorable is that compared to sintered ferrite magnets, less than ¼ the amount of magnet need be used, thus drastically cutting down on the necessary resources while at the same time offering a high-performance motor.

The anisotropic rare earth bonded magnet of the DC brush motor as described in the first aspect, which comprises a permanent magnet arranged on the inside wall of its housing and an electromagnetic rotor core arranged in the center, is characteristically a hollow cylinder magnetized with at least 4 poles. The following mechanism, operation and advantages of the present invention, which are generally becoming popularized, will be introduced in comparison to the 2-pole (ferrite) motor.

The anisotropic bonded magnet adopted in the present invention is a magnet such as those formed by the production methods in Published Unexamined Patent Application Number 2001-7691A, U.S. Pat. No. 2,816,668 and U.S. Pat. No. 3,060,104 as set forth by the applicants of the present patent, for example those magnets that are strongly magnetized along one axis and are manufactured by resin molding of NdFeB-based magnet powder. These magnets have a maximum energy product (BHmax) no less than four times that of the conventional sintered ferrite magnets. After a very devoted investigation by the inventers of the present invention into how the potential of these anisotropic bonded magnets could be harnessed, they found that there would be great advantages in using these magnets especially in 1-300 W small-sized brush motors. By using this anisotropic bonded magnet with high properties, the magnet thickness can be reduced, and at the same time the length of the magnetic path of the magnetic circuit of each magnetic pole can be greatly reduced by making four or more magnetic poles. Because of this, what was once thought to be impossible, has now been realized with epoch-making results of reducing the motor volume by ½ compared to the conventional motor while keeping the torque properties the same, thus resulting in a small, light-weight motor, or alternatively reducing the motor volume by 20% compared to the conventional motor while increasing the torque properties twofold, thus greatly increasing the efficiency.

Moreover, when this anisotropic rare earth bonded magnet is formed by resin molding, it is easy to achieve precision forming. Because of this, the permanent magnet for the inside of the motor housing can be formed into a precise hollow cylinder shape. With this, it is possible to have precise rotational symmetry of the magnetic field inside of the motor made by the permanent magnet. When the interior magnetic field has a high degree of symmetry, the center electromagnetic rotor core receives uniform torque and can rotate. Consequently, the motor is a rather quiet motor, without the rattle and squeak of the conventional motor caused by uneven torque. Furthermore, the use of a hollow-cylinder-shaped resin-formed anisotropic rare earth bonded magnet makes the assembly of the motor housing simple. There is no need to assembly each discrete sintered ferrite magnet of the 2-pole or 4-pole motor as in the conventional motor. Thus, it also has the advantage of simplifying the manufacturing process.

Additionally, the anisotropic rare earth bonded magnets used as permanent magnets in the motors of the second aspect have a maximum energy product no less than 14 MGOe.

Compared to sintered ferrite magnets, anisotropic rare earth bonded magnets that have superior characteristics and a maximum energy product no less than 14 MGOe are much preferred.

Moreover, the motor as mentioned in the third aspect has the special characteristics that for a motor housing outer diameter r, an anisotropic rare earth bonded magnet radial thickness d, an electromagnetic rotor core radius a, and a motor housing thickness w, the ratio of electromagnetic rotor core radius to housing outer diameter a/r is not less than 0.25 and not greater than 0.5, the ratio of housing thickness to magnet thickness w/d is not less than 1 and not greater than 4, and the ratio of magnet thickness to housing outer diameter d/r is not less than 0.01 and not greater than 0.10.

The abovementioned motor housing is intended to include the back yoke, and the motor housing outer diameter r has the meaning of the outer diameter of the motor including the back yoke.

The range limitation of the ratio of electromagnetic rotor core radius to housing outer diameter a/r given here is the common-sense range for commonly used DC brush motors. When a/r is less than 0.25, the electromagnetic rotor core is notably small compared to the motor housing, and from the point of view of motor properties it is clear that the design of the magnet and housing is wasteful. Therefore a/r is generally kept no less than 0.25.

When a/r is 0.5, the motor housing outer diameter and the electromagnetic rotor core diameter (2a) are equal, so it is obvious that a/r must be less than 0.5.

The ratio of housing thickness to magnet thickness w/d is kept within the range of 1 to 4 for the following reasons. In the case of a DC brush motor using ferrite magnets, because the magnetic force of the magnet is weak, it is possible have design which sufficiently prevents magnetic leakage even with a thin housing thickness compared to magnet thickness. However, when using an anisotropic rare earth bonded magnet, the ratio w/d must be no less than 1 because when it is less than 1 the magnetic leakage cannot be prevented due to the strong magnetic force of the magnet. When the ratio w/d is greater than 4, even with magnets having a strong magnet force the housing thickness becomes too thick; there is no magnetic leakage but there is additional meaningless housing thickness, thus preventing sufficient size reduction and causing a deterioration of the motor properties.

The range of the ratio of magnet thickness to housing outer diameter d/r was decided based on the following. Permanent magnet attractive strength increases according to magnet thickness. When the ratio of magnet thickness to housing outer diameter d/r is less than 0.01, the demagnetizing field becomes large and the magnetic attractive strength drops off rapidly, and therefore the prescribed torque can not be obtained. Therefore, it is best to keep the ratio of magnet thickness to housing outer diameter d/r no less than 0.01.

If for example you want to increase a motor's performance index T (T=torque constant/volume) to twice that of the conventional motor, that is to say to obtain a T of 2.6 which is twice that of the conventional 2-pole ferrite motor where T equals approximately 1.3, it is necessary to make the ratio of magnet thickness to housing outer diameter d/r less than 0.1. Consequently, it is desirable to keep the ratio of magnet thickness to housing outer diameter d/r no less than 0.01 and not greater than 0.10. It is certainly possible to realize the motors as mentioned in the first and the second aspects in this way.

Moreover, the motor as mentioned in the fourth aspect has the special characteristics that for motor housing outer diameter r, the anisotropic rare earth bonded magnet radial thickness d, the electromagnetic rotor core radius a, and the motor housing thickness w, the ratio of electromagnetic rotor core radius to housing outer diameter a/r is not less than 0.25 and not greater than 0.5, the ratio of housing thickness to magnet thickness w/d is not less than 1 and not greater than 4, and the ratio of magnet thickness to housing outer diameter d/r is not less than 0.01 and not greater than 0.08.

At a ratio of magnet thickness to housing outer diameter d/r of 0.08, the motor performance index T per unit quantity of magnet used (the motor performance index T/quantity magnet used, or the ratio S, is hereafter referred to as "magnet efficiency") is equal to the magnet efficiency times the magnet performance multiple m of the conventional 2-pole ferrite motor. When the ratio of magnet thickness to housing outer diameter d/r is less than or equal to 0.08, the magnet efficiency S of the motor of the present invention is not less than the magnet efficiency times the magnet performance multiple m of the conventional 2-pole ferrite motor. However, when the ratio of magnet thickness to housing outer diameter d/r is smaller than its lower limit of 0.01, as stated above, the demagnetizing field becomes large and the magnetic attractive strength drops off rapidly, and the prescribed torque can not be obtained. Therefore it is desired to keep the ratio of magnet thickness to housing outer diameter d/r not less than 0.01. In this way when the ratio of magnet thickness to housing outer diameter d/r is not less than 0.01 and not greater than 0.08, the magnet efficiency S is not less than the magnet efficiency times the magnet performance multiple m of the conventional 2-pole ferrite motor. Here, the magnet performance multiple m is defined as the anisotropic bonded magnet performance [(BH)max] divided by the ferrite sintered magnet performance [(BH)max]. For example, if the performance (maximum energy product) of an anisotropic bonded magnet is 14 MGOe, and the performance (maximum energy product) of a ferrite sintered magnet is 3.5, then the magnet performance multiple m is 4. Furthermore, when the magnet efficiency S is equal to the magnet efficiency times the magnet performance multiple m of the conventional 2-pole ferrite motor, the ratio of magnet thickness to housing outer diameter d/r is approximately equal to 0.08 if the anisotropic bonded magnet's maximum energy product is no less than 14 MGOe.

Moreover, the motor as mentioned in the fifth aspect has the special characteristics that for motor housing outer diameter r, the anisotropic rare earth bonded magnet radial thickness d, the electromagnetic rotor core radius a, and the motor housing thickness w, the ratio of electromagnetic rotor core radius to housing outer diameter a/r is not less than 0.25 and not greater than 0.5, the ratio of housing thickness to magnet thickness w/d is not less than 1 and not greater than 4, and the ratio of magnet thickness to housing outer diameter d/r is not less than 0.01 and not greater than 0.05.

When the ratio of magnet thickness to housing outer diameter d/r is less than or equal to 0.05, the magnet efficiency S is not less than two times greater than when d/r is 0.08. That is to say that at a ratio of magnet thickness to housing outer diameter d/r of 0.05, the magnet efficiency S of the motor of the present invention is equal to two times the magnet efficiency times the magnet performance multiple m of the conventional 2-pole ferrite motor. When the ratio of magnet thickness to housing outer diameter d/r is less than or equal to 0.05, the magnet efficiency S of the motor of the present invention is not less than two times the magnet efficiency times the magnet performance multiple m of the conventional 2-pole ferrite motor.

For example, when the performance (maximum energy product) of the anisotropic bonded magnet is 14 MGOe, and the performance (maximum energy product) of the ferrite sintered magnet is 3.5 MGOe, the magnet performance multiple m is 4. When the magnets have these figures, the magnet efficiency S is not less than 8 times the magnet efficiency of the conventional 2-pole ferrite motor. Therefore, it is much desired that the figures be kept within this range.

Moreover, the motor as mentioned in the sixth aspect has the special characteristics that for motor housing outer diameter r, the anisotropic rare earth bonded magnet radial thickness d, the electromagnetic rotor core radius a, and the motor housing thickness w, the ratio of electromagnetic rotor core radius to housing outer diameter a/r is not less than 0.25 and not greater than 0.5, the ratio of housing thickness to magnet thickness w/d is not less than 1 and not greater than 4, and the ratio of magnet thickness to housing outer diameter d/r is not less than 0.02 and not greater than 0.05.

With regards to the magnet efficiency S, it is similar to the situation of the fifth aspect where when the ratio of magnet thickness to housing outer diameter d/r is less than or equal to 0.05, the magnet efficiency S is not less than twice that when d/r is 0.08, which is to say that the magnet efficiency S is greater than or equal to two times the magnet efficiency times the magnet performance multiple m of the conventional 2-pole ferrite motor. The motor performance index T is near its maximum value when the ratio of magnet thickness to housing outer diameter d/r is not less than 0.02 and not greater than 0.05. When the maximum energy product is 14 MGOe, a motor performance index T of the motor of the present invention that is 2.3 times that of the motor performance index T of the conventional 2-pole ferrite motor is obtained. When the maximum energy product is 17 MGOe, a motor performance index T of the motor of the present invention that is 2.5 that of the motor performance index T of the conventional 2-pole ferrite motor is obtained. When the maximum energy product is 25 MGOe, a motor performance index T of the motor of the present invention that is 2.6 times that of the motor performance index T of the conventional 2-pole ferrite motor is obtained. Thus, a ratio of magnet thickness to housing outer diameter d/r in the range not less than 0.02 and not greater than 0.05 is much desired from the viewpoints of motor performance index T and magnet efficiency S.

The permanent magnet as mentioned in the seventh aspect has the special characteristics that it is a permanent magnet located on the periphery of the electromagnetic rotor core of a DC brush motor, and is an anisotropic rare earth bonded magnet in a thin-walled hollow cylinder shape magnetized with at least 4 poles. This anisotropic rare earth bonded magnet is for example a magnet manufactured via resin forming of NdFeB-based magnet powder, and strongly magnetized along one axis. This magnet has the special characteristic of having a maximum energy product (BHmax) not less than four times greater than that of the conventional sintered ferrite magnet.

After an investigation by the inventers of the present invention into how the potential of these anisotropic bonded magnets could be harnessed, they found that there would be remarkable advantages in making these magnets thin and using them in 1-300 W small-sized brush motors in particular. They found that at the same time as greatly reducing the length of the magnetic path the magnetic circuit of each magnetic pole by making four or more magnetic poles, the motor volume can be reduced by ½ compared to the conventional motor while keeping the torque properties the same, thus resulting in a considerably smaller, light-weight motor that could not have been imagined previously, or alternatively the motor volume can be reduced by 20% compared to the conventional motor while increasing the torque properties twofold, thus greatly increasing the efficiency.

As this anisotropic rare earth bonded magnet is made by resin forming, its shape can be formed with good precision. Because of this, it is possible to make a very precise hollow cylinder shaped permanent magnet for the inside of the magnet housing. With the adoption of such a magnet, it is possible to obtain precise rotational symmetry of the motor interior's magnetic field. An interior field with a high degree of symmetry enables the electromagnetic rotor core in the center to receive uniform torque. By adopting this magnet, the noise associated with uneven torque can be reduced, and a quiet motor can be realized. In addition, as the anisotropic rare earth bonded magnet can be resin formed into a precise hollow cylinder shape, the assembly into the motor housing becomes easier. There is no need to assemble each of the discrete 2-pole or 4-pole sintered ferrite magnets as has been necessary up until now. This anisotropic rare earth bonded magnet also has the advantage of making the motor manufacturing process simpler.

The permanent magnet mentioned in the eighth aspect have the special characteristic that they are an anisotropic rare earth bonded magnet with a maximum energy product not less than 14 MGOe.

Anisotropic rare earth bonded magnets are preferred to sintered ferrite magnets as they have superior magnetic characteristics and have a maximum energy product not less than 14 MGOe.

Moreover, when an anisotropic rare earth bonded magnet with a maximum energy product not less than 14 MGOe is prepared with 4 or more magnetic poles as mentioned in the seventh aspect, the torque output is very high. Therefore, if the same torque conditions are adopted, the axial length of the anisotropic rare earth bonded magnet can be cutback, and the motor volume can be further reduced. For example, as will be explained in the following text, the volume of the conventional motor using a sintered ferrite magnet can be reduced by roughly 50%.

Moreover, the permanent magnet as mentioned in the ninth aspect has the special characteristics that for motor housing outer diameter r, the anisotropic rare earth bonded magnet radial thickness d, the electromagnetic rotor core radius a, and the motor housing thickness w, the ratio of electromagnetic rotor core radius to housing outer diameter a/r is not less than 0.25 and not greater than 0.5, the ratio of housing thickness to magnet thickness w/d is not less than 1 and not greater than 4, and the ratio of magnet thickness to housing outer diameter d/r is not less than 0.01 and not greater than 0.10.

The range of a/r and the range of w/d have the same values as discussed in the explanation of the invention of the third aspect.

The magnetic force of a permanent magnet is proportional to its thickness. When the ratio of magnet thickness to housing outer diameter d/r is less than 0.01, the demagnetizing field becomes large and the resultant magnetic force quickly deteriorates. A motor created with these conditions could not obtain the prescribed output. Therefore when permanent magnets are to be used in a motor, it is desired that the ratio of anisotropic rare earth bonded magnet thickness to housing outer diameter d/r is not less than 0.01.

Using this anisotropic rare earth bonded magnet, in order to double the conventional motor performance index T (T=torque constant/volume), for example to obtain T=2.6 that is double the conventional 2-pole ferrite motor performance index (around 1.3), the ratio of magnet thickness to housing outer diameter d/r must be less than or equal to 0.1. The conditions are, for example, those of the situation whose description follows where the interior electromagnetic rotor core diameter is kept the same. Thus it is desirable to keep the ratio of magnet thickness to housing outer diameter d/r not less than 0.01 and not greater than 0.10. If these conditions are combined with the permanent magnet mentioned in the fourth and fifth aspects, it is sure that a motor can be realized which is quieter than the conventional motor and which has ½ the volume with the same torque, or which has twice the torque with a 20% reduced volume.

Moreover, the permanent magnet as mentioned in the tenth aspect has the special characteristics that for motor housing outer diameter r, anisotropic rare earth bonded magnet radial thickness d, electromagnetic rotor core radius a, and motor housing thickness w, the ratio of electromagnetic rotor core radius to housing outer diameter a/r is not less than 0.25 and not greater than 0.5, the ratio of housing thickness to magnet thickness w/d is not less than 1 and not greater than 4, and the ratio of magnet thickness to housing outer diameter d/r is not less than 0.01 and not greater than 0.08.

The values of these figures are the same as those explained in the invention of the fourth aspect.

Moreover, the permanent magnet as mentioned in the eleventh aspect has the special characteristics that for motor housing outer diameter r, anisotropic rare earth bonded magnet radial thickness d, electromagnetic rotor core radius a, and motor housing thickness w, the ratio of electromagnetic rotor core radius to housing outer diameter a/r is not less than 0.25 and not greater than 0.5, the ratio of housing thickness to magnet thickness w/d is not less than 1 and not greater than 4, and the ratio of magnet thickness to housing outer diameter d/r is not less than 0.01 and not greater than 0.05.

The values of these figures are the same as those explained in the invention of the fifth aspect.

Moreover, the permanent magnet as mentioned in twelfth aspect has the special characteristics that for motor housing outer diameter r, anisotropic rare earth bonded magnet radial thickness d, electromagnetic rotor core radius a, and motor housing thickness w, the ratio of electromagnetic rotor core radius to housing outer diameter a/r is not less than 0.25 and not greater than 0.5, the ratio of housing thickness to magnet thickness w/d is not less than 1 and not greater than 4, and the ratio of magnet thickness to housing outer diameter d/r is not less than 0.02 and not greater than 0.05.

The values of these figures are the same as those explained in the invention of the sixth aspect.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DETAILED DESCRIPTION OF PREFERRED EMBODIMENTS

The following will be an explanation of the implementation of the present invention. However, the present invention is not limited to the following implementation.

(Embodiment 1)

Figure 1A:
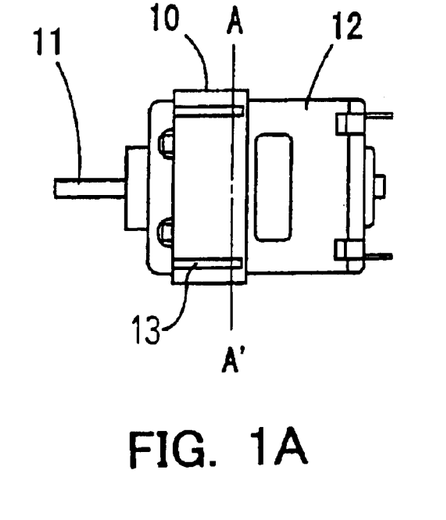
FIG. 1 is a configuration of a motor of a concrete embodiment of the present invention.
Figure 1B:
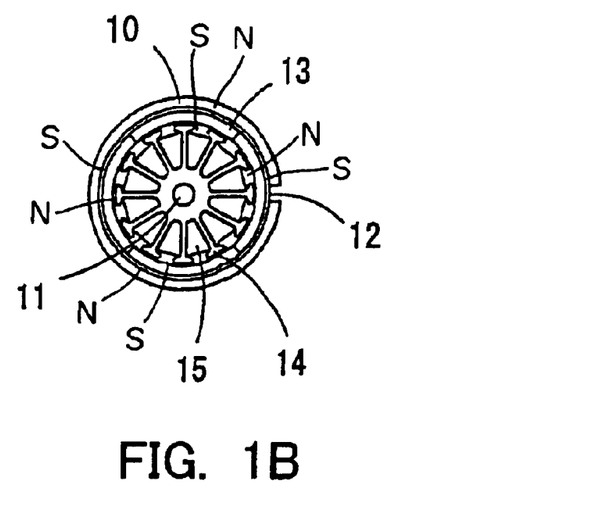
Figure 1C:
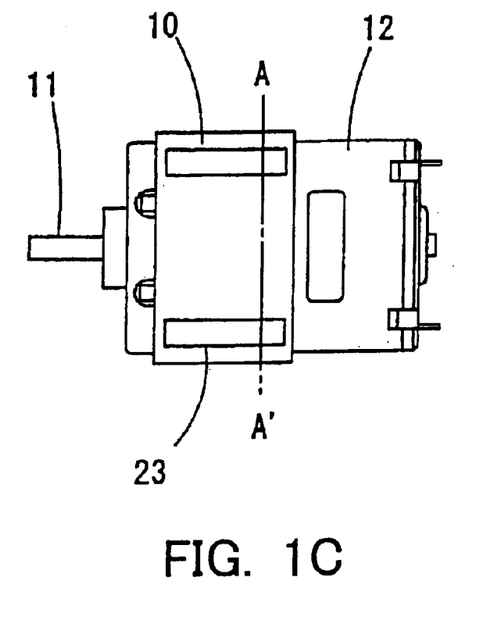
Figure 1D:
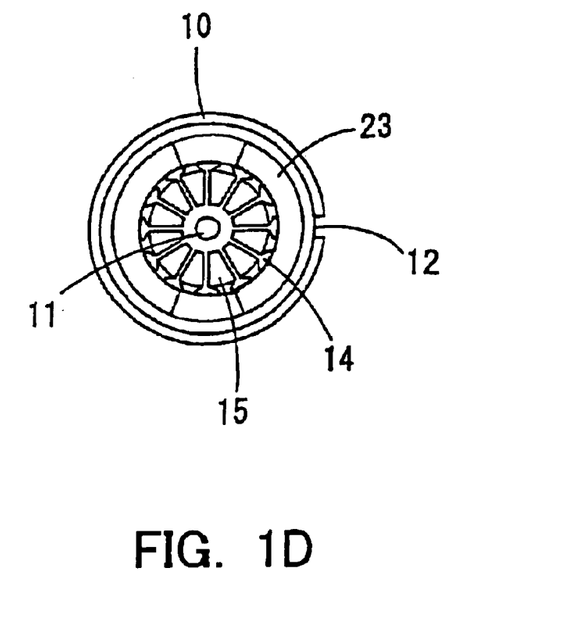
Figure 2A:
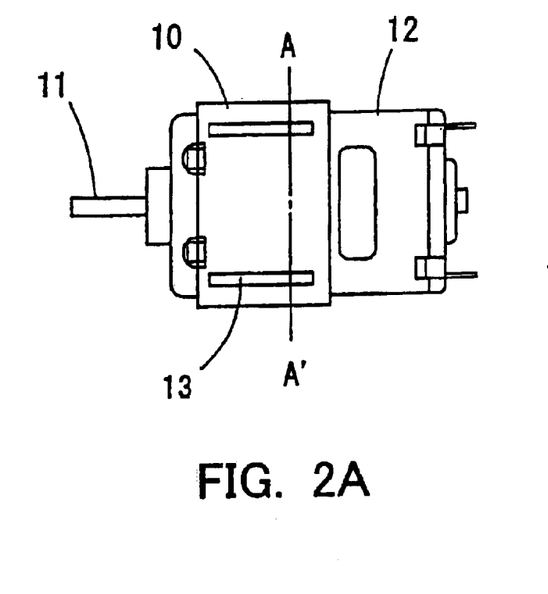
FIG. 2 is a configuration of a motor of another concrete embodiment of the present invention.
Figure 2B:
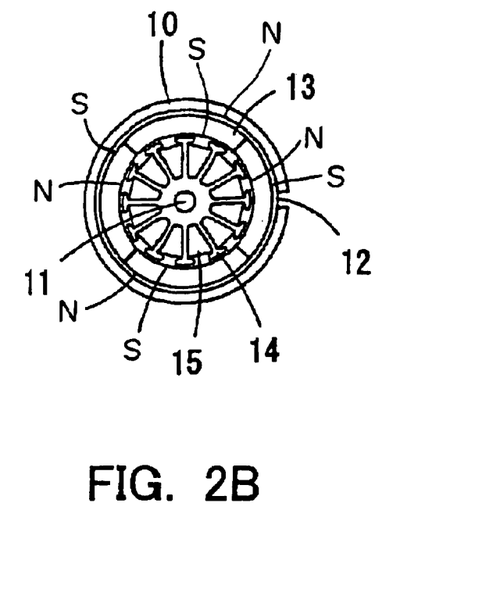
Figure 2C:
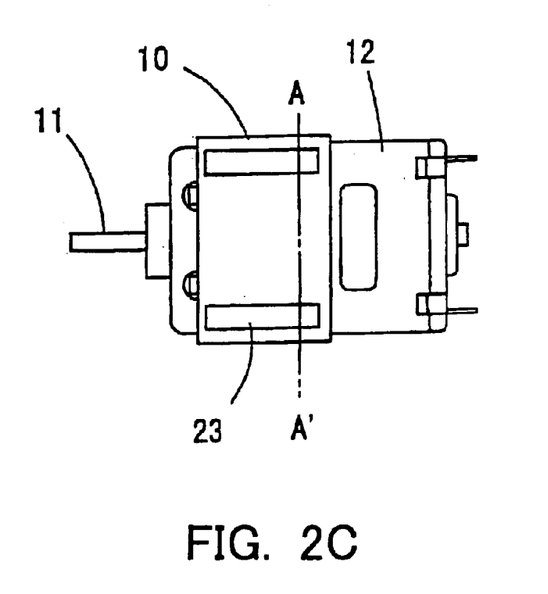
Figure 2D:
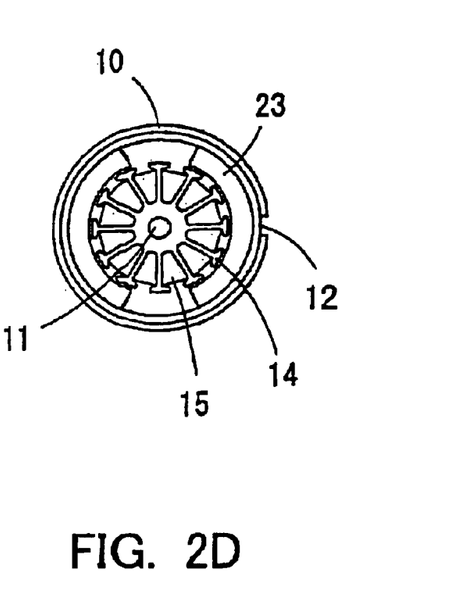

FIGS. 1A and 1B shows an example motor of the present embodiment. This figure includes the side view 1A and the cross sectional view 1B through AA'. The purpose of the present embodiment is to make a smaller motor than the conventional motor. The motor of the present embodiment is comprised of a housing 12, an anisotropic rare earth bonded magnet 13 as the hollow cylinder permanent magnet set in the inner perimeter of the housing 12, an armature 14 making the electromagnetic rotor core set in the center, coils 15 wrapped around armature 14, a rotary shaft 11 extending from the center of armature 14, and a back yoke 10 that is a flux ring for prevention of magnetic flux leakage. The back yoke is a part of the housing. The motor housing and the back yoke have the same function as a magnetic circuit. Therefore In the present embodiment, the housing outer diameter as mentioned in the claims is the diameter of the back yoke. For a volume comparison, the conventional 2-pole motor is shown in FIGS. 1C and 1D. This figure includes the side view 1C and the cross sectional view 1D through AA'. For the sake of comparison of both motors, the armature 14 outer diameter is the same. In recent years it has become possible to mass-produce said anisotropic rare earth bonded magnet 13, although this depends on the applicant. For example, this anisotropic rare earth bonded magnet 13 can be made by the manufacturing process as laid out in Published Unexamined Patent Application Number 2001-7691A, U.S. Pat. No. 2,816,668 and U.S. Pat. No. 3,060,104. These anisotropic rare earth bonded magnets with a maximum energy product of 14 MGOe–25 MGOe can presently be manufactured.

The difference between the motor of the present embodiment (FIGS. 1A and 1B) and the conventional motor (FIGS. 1C and 1D) is that the sintered ferrite magnets 23 used as the permanent magnets of the conventional motor have been replaced by a NdFeB-based hollow cylinder anisotropic rare earth bonded magnet 13. This magnet has been magnetized with 4 poles, and the magnet path length of each pole's magnetic circuit has been greatly reduced, thus allowing for an increase of torque applied to the armature. This is the first distinctive feature of the present invention. Anisotropic rare earth bonded magnet 13 is a magnet that is manufactured via resin forming of NdFeB-based magnet powder, and is strongly magnetized in the axial direction. The material of the anisotropic rare earth bonded magnet may be NdFeB or a NdFeB-type material, for example a combination of Nd and a rare earth element other than Nd, or a material with other additive elements. Furthermore, materials containing rare earth elements other than Nd, such as SmFeN-type materials, SmCo-type materials, NdFeB-type materials or a combination of these materials, may also be used. Bonded magnets are also called plastic magnets. This magnet has the special characteristic that its maximum energy product (BHmax) is not less than four times greater than that of the conventional sintered ferrite magnet. That is to say that it has a maximum energy product not less than 14 MGOe, which is around 4 times the maximum energy product of 3.5 MGOe of the standard sintered ferrite magnet 23. This means that if the motor torque (same torque conditions) is kept the same as for the conventional motor, it is possible to reduce the thickness of the permanent magnet to ¼.

The second distinctive feature is that when the permanent magnet has been scaled down, for motor housing (back yoke 10) outer diameter (housing outer diameter) r, hollow cylinder anisotropic rare earth bonded magnet 13 thickness (magnet thickness) d, electromagnetic rotor core that is armature 14 radius (electromagnetic rotor core radius) a, motor housing thickness (thickness including the housing 12 and the back yoke 10) (housing thickness) w, the ratio of electromagnetic rotor core radius to housing outer diameter a/r is not less than 0.25 and not greater than 0.5, the ratio of housing thickness to magnet thickness w/d is not less than 1 and not greater than 4, and the ratio of magnet thickness to housing outer diameter d/r is not less than 0.01 and not greater than 0.10 (under small sized conditions). The values for the ranges of a/r and w/d are the same as those mentioned in the explanation of the invention of the third aspect under the mechanism of solving said challenges as well as effects of using the present invention.

The lower limit of the ratio of magnet thickness to housing outer diameter was decided to be 0.01 because at values less than that the demagnetizing field rapidly increases, resulting in a decrease in magnetic force, and thus the prescribed motor torque is unable to be obtained. The upper limit of the ratio of magnet thickness to housing outer diameter d/r is the condition under which the motor performance index T (T=torque constant/volume) is twice that of the conventional motor. That is to say, it is the condition under which the volume can be reduced by ½ or the torque can be multiplied by two. For example, if the performance index is approximately 1.3 times that of the conventional 2-pole ferrite motor, then the condition is that at which the performance index T is equal to 2.6. Under these conditions, a small motor with 50% reduced volume but the same torque can be realized.

For example, a conventional motor using sintered ferrite magnet 23 has a back yoke 10 (motor housing) outer diameter of 38 mm, an inner diameter of 32 mm, a motor output (torque) of 75.7 (mN*m/A), and a volume of approximately 56.1 cm$^3$. The sintered ferrite magnet 23 has an outer diameter of 32 mm, inner diameter of 24, and a radial length (thickness) of approximately 4 mm. Accordingly, a/r=0.30, w/d=0.75 and d/r=0.11.

At the same time, the motor of the present embodiment, which has the same torque, has a back yoke 10 of outer diameter r=31 mm and inner diameter of 26 mm, and a volume of 24.5 cm$^3$. Anisotropic rare earth bonded magnet 13 has an outer diameter of 26 mm, an inner diameter of 24 mm and a radial thickness of d=1 mm, and it is magnetized in a 4-pole configuration. With 4-pole magnetization, the magnetic path length of the magnetic circuit is shortened. Therefore, a/r=0.37, w/d=2.5 and d/r=0.03. Thus when instituted, a motor whose volume is 44% of the volume of a conventional motor, while maintaining the same torque, can be realized. Moreover, the performance index T is 3.09, which is 2.3 times that of the conventional motor's 1.35.

In the present embodiment, the armature thickness was decided so that the torque would be the same as that of the conventional motor. This was done because the anisotropic rare earth bonded magnet 13 of the present embodiment was magnetized in a 4-pole configuration. The conventional armature thickness is approximately 17.5 mm, while the present embodiment's armature thickness is approximately 9.8 mm. The motor's axial length was decided to include the part at the rear of the motor shared by the commutator. By doing this, the axial length of the conventional motor $L_F$ is approximately 50 mm, while the axial length of the motor of the present embodiment is approximately 33 mm, thus making the length reduction ratio $L_N/L_F$=0.66. Moreover, the weight of the conventional motor is 245 g, while that of the motor of the present embodiment is 191 g, thus indicating a decrease of 49% compared to the conventional.

Moreover, as the anisotropic rare earth bonded magnet 13 of the present practical invention is manufactured by resin forming, it can be made into a precise hollow cylinder shape. Therefore, anisotropic rare earth bonded magnet 13 can easily be precisely and symmetrically magnetized. Because the magnetic field in the inner part of the motor can be generated precisely and symmetrically, armature 14 will receive uniform torque. Thus the squeaking and rattling associated with the conventional motor during rotation does not occur, and a quiet motor can be achieved.

The sintered ferrite 2-pole motor and the anisotropic rare earth bonded 4-pole motor were mentioned above and their respective descriptions were given. The sintered ferrite 4-pole motor and anisotropic rare earth bonded 2-pole motor are shown in Table 1 for comparison.

mance index T of T=1.35, and all other dimensions the same as those of the conventional motor explained in embodiment 1.

The motor of the present embodiment is shown in FIG. 2. In the present embodiment, the ratio of electromagnetic rotor

TABLE 1

| Magnet Type | | Ferrite | Ferrite | Ferrite | Anisotropic | Anisotropic | Anisotropic |
|---|---|---|---|---|---|---|---|
| Magnet (sintered, bonded) | | Sintered | Sintered | Sintered | Bonded | Bonded | Bonded |
| Maximum Energy Product | | 3.5 MGOe | 3.5 MGOe | 3.5 MGOe | 17 MGOe | 17 MGOe | 17 MGOe |
| Number of Magnetic Poles | | 2 | 4 | 6 | 2 | 4 | 6 |
| Magnet Size | Diameter (mm) | 32-24 | 32-24 | 32-24 | 28-24 | 26-24 | 25.4-24 |
| | Thickness (mm) | 4 | 4 | 4 | 2 | 1 | 0.7 |
| | Length (mm) | 21 | 18 | 18 | 12.25 | 11.3 | 12.42 |
| | | 135 deg. 2 tiles | 67.5 deg. 4 tiles | 45 deg. 6 tiles | ring | ring | ring |
| Back Yoke | Diameter (mm) | 38-32 | 38-32 | 38-32 | 34-28 | 31-26 | 28.4-25.4 |
| | Thickness (mm) | 3 | 3 | 3 | 3 | 2.5 | 1.5 |
| | Length (mm) | 49.5 | 46.5 | 46.5 | 42.75 | 33 | 35.12 |
| Armature Thickness (mm) | | 17.5 | 15 | 15 | 10.75 | 9.8 | 10.8 |
| Torque Constant (mN*m/A) | | 75.7 | 75.7 | 75.7 | 75.7 | 75.7 | 75.7 |
| Motor Volume (cm$^3$) | | 56.13 | 52.7 | 52.7 | 38.8 | 24.5 | 22.25 |
| Motor Weight (g) | | 245 | 229 | 229 | 148 | 119 | 100 |
| Performance Index T | | 1.35 | 1.44 | 1.44 | 1.95 | 3.09 | 3.40 |

The housing outer diameter of the present embodiment is the same as the back yoke outer diameter.

Back yoke material SPCC
Armature material, dimensions silicone sheet, φ23 mm
Coil winding, turns 145 turns
Amount of Current 1 A
Fixed Conditions Armature outer diameter φ23 mm was kept the same, and axial thickness was adjusted to achieve the same torque.

Figure 3:
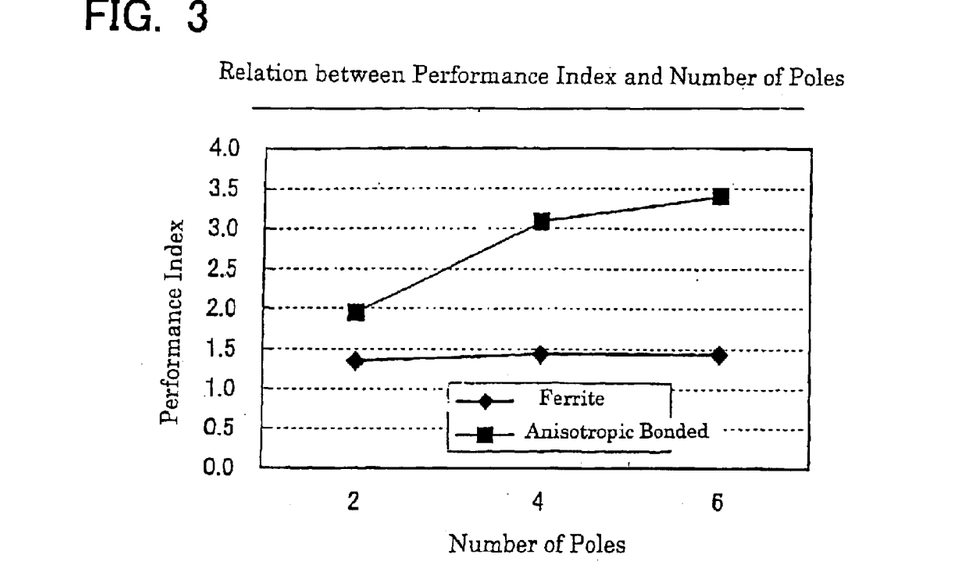
FIG. 3 is characteristics of the relation between number of poles and performance index for motors using ferrite sintered magnets and motors using an anisotropic bonded magnet.

In order to explain the results of the abovementioned figure in an easy to understand way, the relation between the performance index and the number of poles is shown in FIG. 3. From FIG. 3 it can be seen that there is no major improvement when the magnet of a conventional sintered ferrite 2-pole motor is simply replaced with an anisotropic rare earth bonded magnet to make an anisotropic rare earth bonded 2-pole motor, nor when a 2-pole sintered ferrite motor is simply changed to a 4-pole sintered ferrite motor. The performance index remains in the 1.2–2.0 range. But compared to this, as is presented in the present embodiment, when an anisotropic rare earth bonded magnet is used in combination with the switch to a 4-pole motor, a performance index of 3.09 can be obtained. This figure indicates the realization of a significant improvement over the performance index of the conventional sintered ferrite 2-pole motor with a performance index increase of 2.3 times.
(Embodiment 2)

Embodiment 1 was an example of the size reduction of the conventional motor by the use of an anisotropic rare earth bonded magnet. Using this anisotropic rare earth bonded magnet, with adjustment of radial thickness, it is possible to increase the motor torque. The present embodiment is an example of using an anisotropic rare earth bonded magnet to double the torque.

For example, the conventional motor using sintered ferrite magnet 23 has a torque of 75.7 (mN*m/A), a volume of approximately 56.1 cm$^3$, which is to say a motor perforcore radius to housing outer diameter a/r is not less than 0.25 and not greater than 0.5, the ratio of housing thickness to magnet thickness w/d is not less than 1 and not greater than 4, and the abovementioned conditions for small size (0.01≦d/r≦0.1) are adhered to. The motor housing (back yoke 10) outer diameter r=34 mm, and inner diameter is 28 mm. Anisotropic rare earth bonded magnet 13 is magnetized with 4 poles, and has an outer diameter of 28 mm, an inner diameter of 24 mm, and a thickness of 2 mm. In this case, a/r=0.34, w/d=1.5 and d/r=0.06. With the 4-pole magnetic configuration, the magnetic path length of the magnetic circuit is shortened. The armature thickness is 17.5 mm, which is the same as that of the conventional motor. The motor of the present embodiment is designed to achieve twice the torque (155.5 mN*m/A) of the conventional motor. In addition, at 41.2 cm$^3$ the volume of this motor realizes a 27% volume reduction ratio compared to the conventional motor, and the weight of the motor of the present embodiment is 185 g, which is a 76% reduction compared to the 245 g of the conventional motor.

Similarly to embodiment 1, in this case anisotropic rare earth bonded magnet 13 can be precisely formed into a hollow-cylinder shape, and very symmetrical magnetic field can be generated. Thus a high output, quiet motor can be achieved.
(Embodiment 3)

Figure 4:
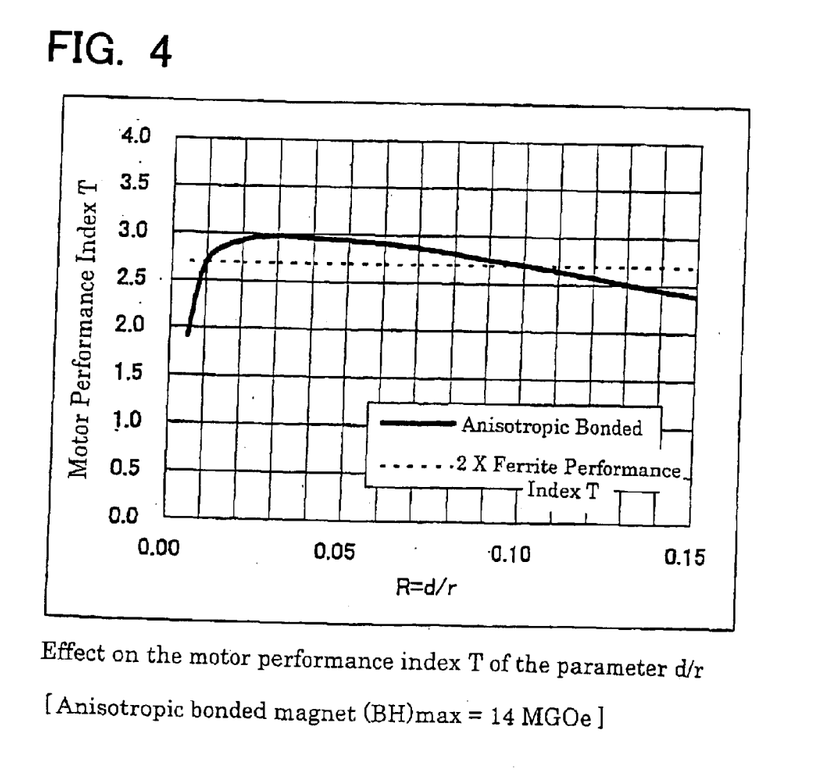
FIG. 4 is characteristics of the relation between performance index T and ratio R, for an anisotropic rare earth bonded magnet with a maximum energy product of 14 MGOe.

The motor of embodiment 1, which is a low output level DC brush motor of the present invention, is maintained with the following common-sense conditions (1) the ratio of electromagnetic rotor core radius to housing outer diameter a/r is not less than 0.25 and not greater than 0.5, and (2) the ratio of housing thickness to magnet thickness w/d is not less than 1 and not greater than 4, while the ratio of anisotropic rare earth bonded magnet 13 thickness to housing outer diameter d/r=R (hereafter referred to simply as ratio R) is changed and the motor performance index T is evaluated. The characteristics when anisotropic rare earth bonded magnet 13 has a maximum energy product of 14 MGOe are shown in FIG. 4. When ratio R is in the range not less than 0.01 and not greater than 0.10, the performance index T is greater than twice the performance index T of the conventional 2-pole ferrite motor (1.3). If the ratio R is less than the lower limit of 0.01, even with magnet strength of 25 MGOe, the superior characteristics of twice the performance index of the abovementioned conventional motor will not be obtained.

Figure 6:
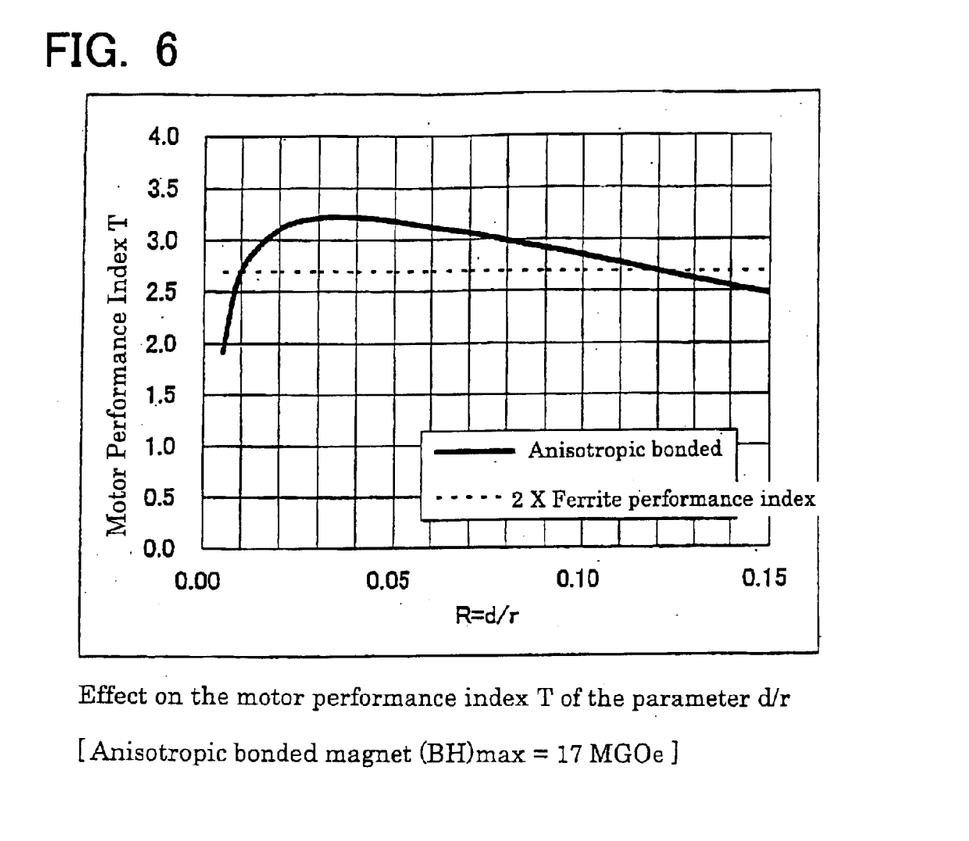
FIG. 6 is characteristics of the relation between performance index T and ratio R, for an anisotropic rare earth bonded magnet with a maximum energy product of 17 MGOe.
Figure 8:
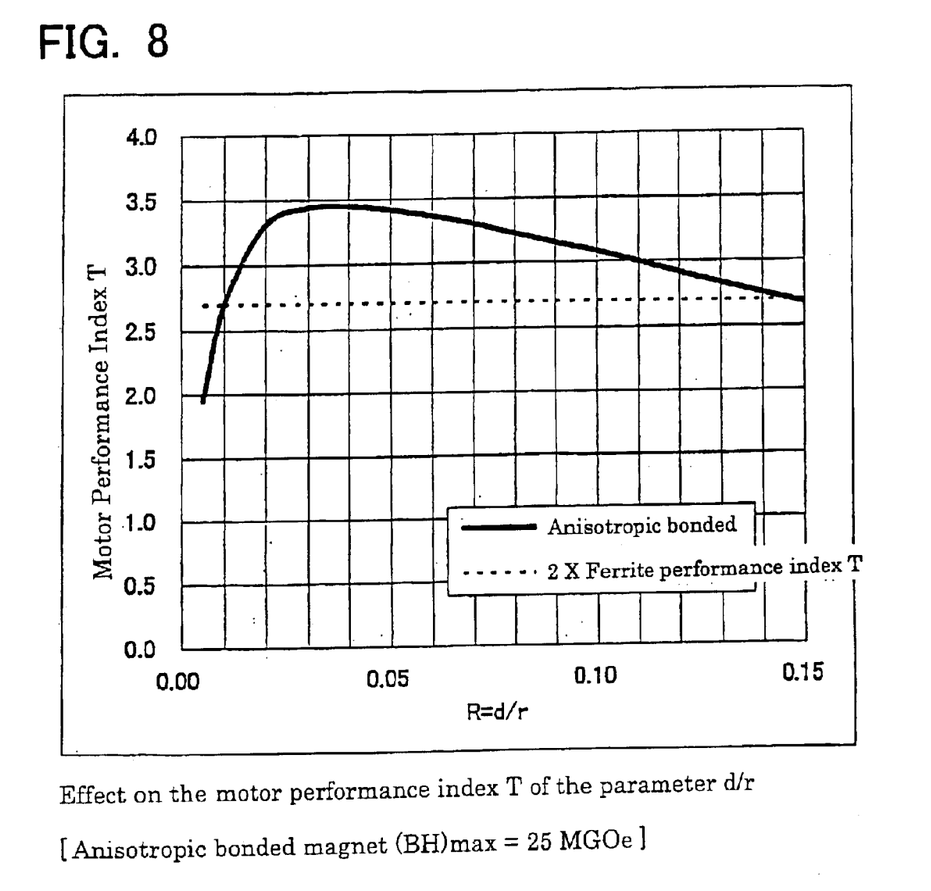
FIG. 8 is characteristics of the relation between performance index T and ratio R, for an anisotropic rare earth bonded magnet with a maximum energy product of 25 MGOe.

Similarly, the characteristics for anisotropic rare earth bonded magnet 13 with maximum energy product of 17 MGOe and 25 MGOe are shown in FIGS. 6 and 8 respectively. It can be understood that when the maximum energy product is larger, the overall performance index T is larger as well.

Figure 5:
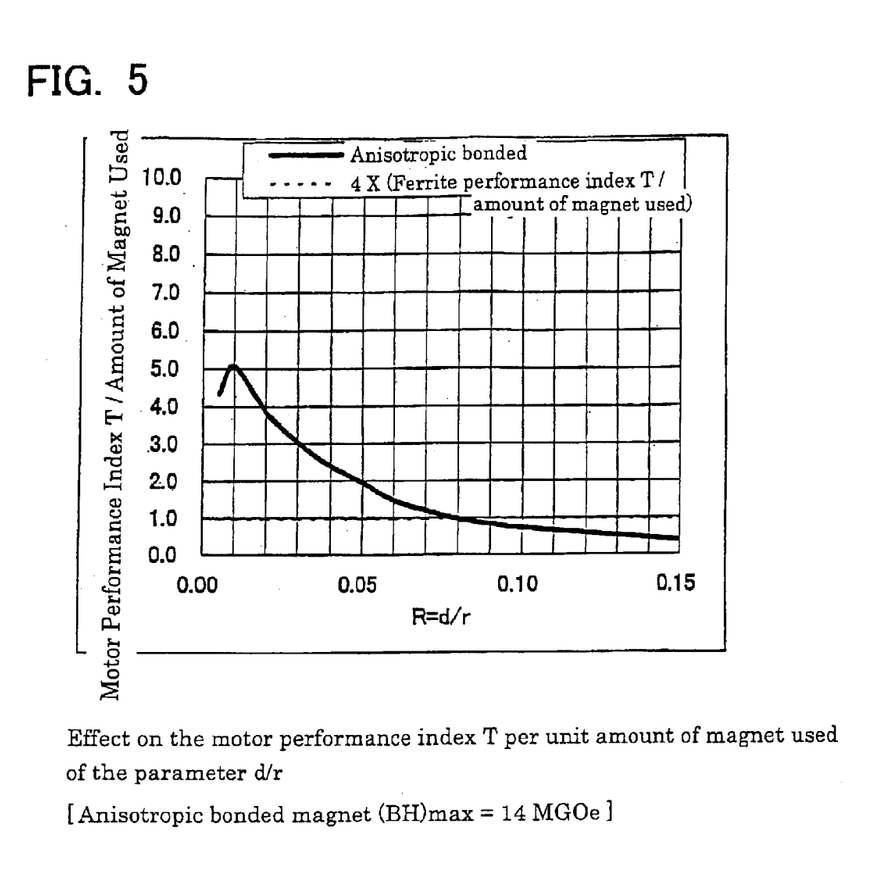
FIG. 5 is characteristics of the relation between magnet efficiency S and ratio R, for an anisotropic rare earth bonded magnet with a maximum energy product of 14 MGOe.
Figure 7:
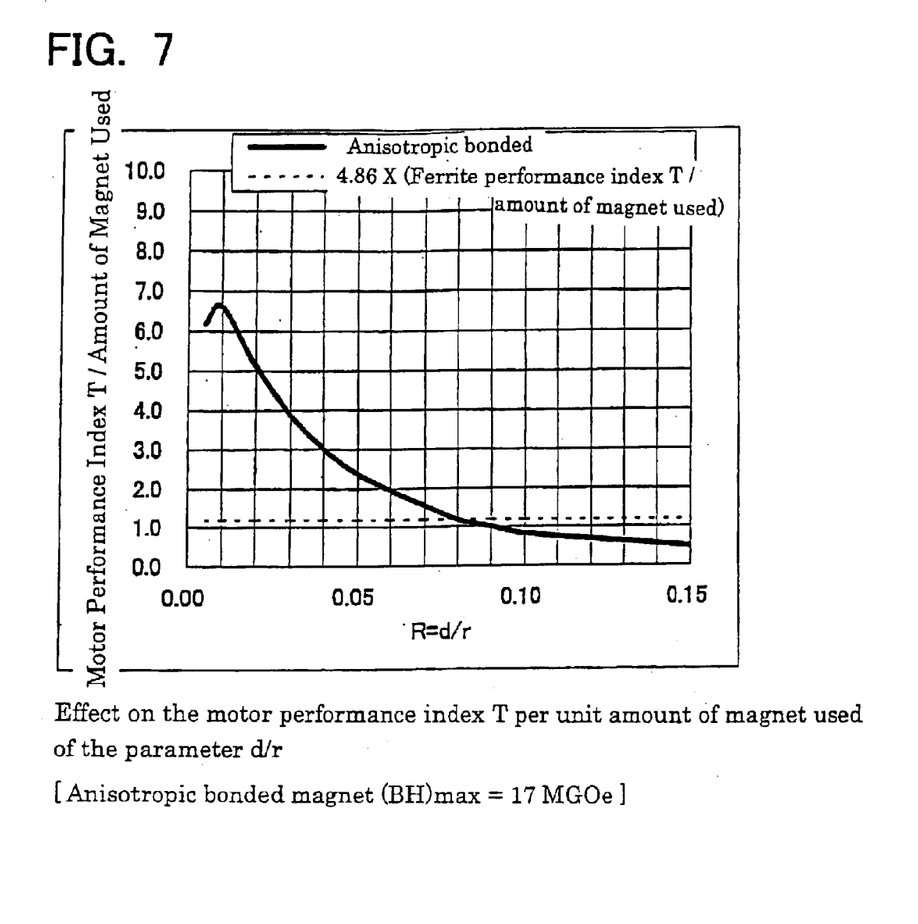
FIG. 7 is characteristics of the relation between magnet efficiency S and ratio R, for an anisotropic rare earth bonded magnet with a maximum energy product of 17 MGOe.
Figure 9:
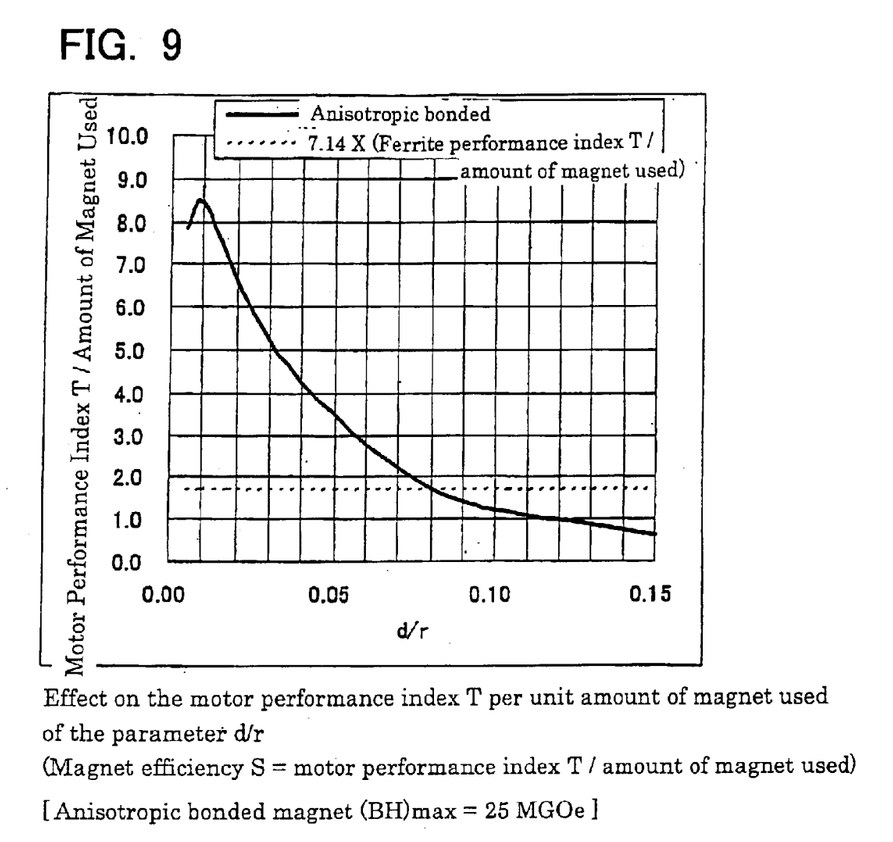
FIG. 9 is characteristics of the relation between magnet efficiency S and ratio R, for an anisotropic rare earth bonded magnet with a maximum energy product of 25 MGOe.

Next, where the volume of anisotropic rare earth bonded magnet 13 is v, and the performance index T per bonded magnet unit volume T/v is the magnet efficiency S, the variation characteristics with relation to ratio R were investigated. The characteristics when the maximum energy product was 14 MGOe, 17 MGOe and 25 MGOe are shown in FIGS. 5, 7 and 9 respectively. When ratio R is not less than 0.01 and not greater than 0.08, it can be understood that the magnet efficiency S is not less than the magnet efficiency of the conventional 2-pole ferrite motor times the magnet performance multiple m. These characteristics can be realized for maximum energy products not less than 14 MGOe.

When the ratio R is less than or equal to 0.05, the magnet efficiency S is at least twice that when R is 0.08. That is to say the magnet efficiency S is not less than two times the magnet efficiency of the conventional 2-pole ferrite motor times the magnet performance multiple m. This means that it is equal to the magnet efficiency multiplied by twice the magnet performance multiple m. In this case, the magnet performance multiple m is twice as efficient as sintered ferrite, and it is possible to increase the motor performance index T per unit amount of magnet used. These characteristics can be realized for maximum energy products not less than 14 MGOe.

When ratio R is in the range not less than 0.02 and not greater than 0.05, the magnet efficiency S is at least twice that when d/r is 0.08. That is to say that the magnet efficiency S is not less than 2 m times greater than the magnet efficiency of the conventional 2-pole ferrite motor. When the motor performance index T is evaluated, it can be understood that when the ratio of magnet thickness to housing outer diameter d/r is in the range not less than 0.02 and not greater than 0.05 the motor performance index T is at about its maximum value. With a maximum energy product of 14 MGOe, a performance index T that is 2.3 times that of the conventional 2-pole ferrite motor can be obtained. With a maximum energy product of 17 MGOe, a performance index 2.5 times that of the conventional 2-pole ferrite motor can be obtained. With a maximum energy product of 25 MGOe, a performance index 2.6 times that of the conventional 2-pole ferrite motor can be obtained. These characteristics can be realized for maximum energy products not less than 14 MGOe.

Therefore, from the viewpoints of both motor performance index T and magnet efficiency S, it is desired to keep the ratio of magnet thickness to housing outer diameter d/r in the range not less than 0.02 and not greater than 0.05.

The magnet efficiency S is thought of in the following way. Where torque constant is T, motor volume is V, anisotropic rare earth bonded magnet volume is v, motor outer diameter is r, anisotropic bonded magnet radial thickness is d, ratio of magnet thickness to housing outer diameter d/r is R, electromagnetic rotor core radius is a, housing thickness is w, motor effective length is L, and air gap between the electromagnetic rotor core and the anisotropic rare earth bonded magnet is neglected, the following equations can be written.

[Equation 1]

$$2a+2d+2w=r \qquad (1)$$

[Equation 2]

$$R=d/r \qquad (2)$$

[Equation 3]

$$V=\pi r^2 L/4 \qquad (3)$$

[Equation 4]

$$v=\pi\{(a+d)^2-a^2\}L \qquad (4)$$

Because d<<a,
[Equation 5]

$$v=2\pi a d L \qquad (5)$$

Therefore magnet efficiency S follows the following equation,
[Equation 6]

$$\begin{aligned}S &= \tau/(Vv) \\ &= 2\tau/\{\pi^2 L^2 a d r^2\} \\ &= 2\tau/\{\pi^2 L^2 (r/2 - d - w)\, dr^2\}\end{aligned} \qquad (6)$$

When d=Rr is substituted into (6), the following equation is obtained.
[Equation 7]

$$\begin{aligned}S &= 2\tau/\{\pi^2 L^2 (r/2 - Rr - w) Rr^3\} \\ &= \tau/\{\pi^2 L^2 r^3 [(1-2R)r - 2W]R\}\end{aligned} \qquad (7)$$

These characteristics are shown in FIGS. 5, 7 and 9.

(Embodiment 4)

A 6-pole motor with the same dimensions as embodiment 1 was manufactured. This motor's dimensions and characteristics are as shown in Table 1. Similarly, the performance index T was evaluated with respect to a 6-pole motor using a ferrite magnet. This motor's dimensions and characteristics are also shown in Table 1. Performance index T characteristics were obtained as shown in FIG. 3. It can be understood from these characteristics that when increasing from a 2-pole to 4-pole design, the performance index T of the present invention's motor that uses an anisotropic rare earth bonded magnet drastically increases. Furthermore, when increasing from a 4-pole to 6-pole design, the performance index T is 1.10 times that of a 4-pole and 1.74 times that of a 2-pole. There is not much variation in the motor performance index T for the various pole configurations of a motor using a ferrite magnet. That is to say, with an increase from a 4-pole to a 6-pole design there is no change at all from the 4-pole performance index T, and the performance index T of the 6-pole design stops at 1.07 times greater than the performance index for a 2-pole design. From this it can be understood that the motor of the present invention using an anisotropic rare earth bonded magnet makes it possible to obtain results that were thought to be impossible with the conventional motor using a ferrite magnet.

(Embodiment 5)

Figure 10:
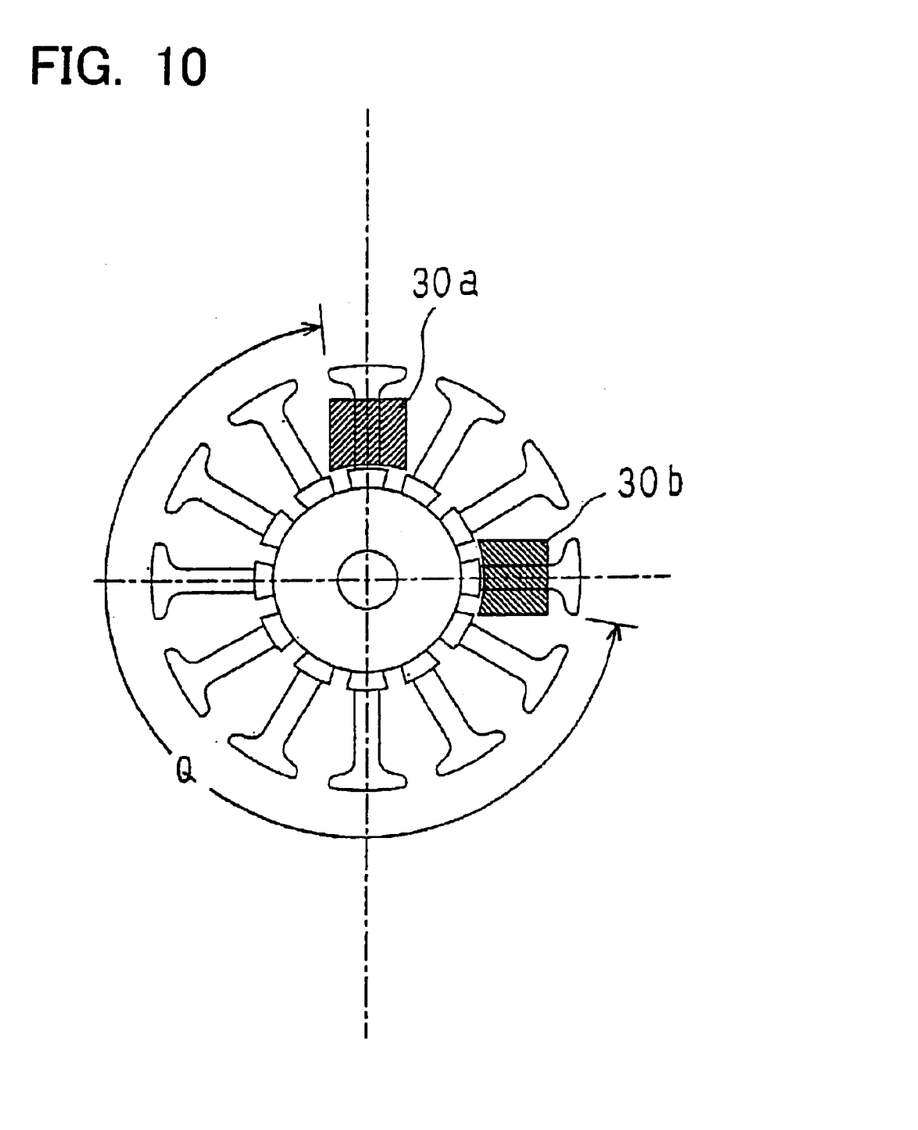
FIG. 10 is configuration of brush location for the motor of embodiment 5.

In the motor of embodiment 1, brush 30*a* and 30*b* are arranged as shown in FIG. 10. That is to say that the brushes are not facing each other at 180°, but rather are set at a position 90° from each other. With this arrangement, there is a space in which no brush exists, shown by area Q in FIG. 10. Because this space is made to be so large, an electrical circuit can be arranged in this area Q. In a 6-pole design, the two brushes will be set 60° apart and the large space can be maintained. In an 8-pole design, the two brushes can be set 22.5° or 67.5° apart and the large space can be maintained.

Figure 11:
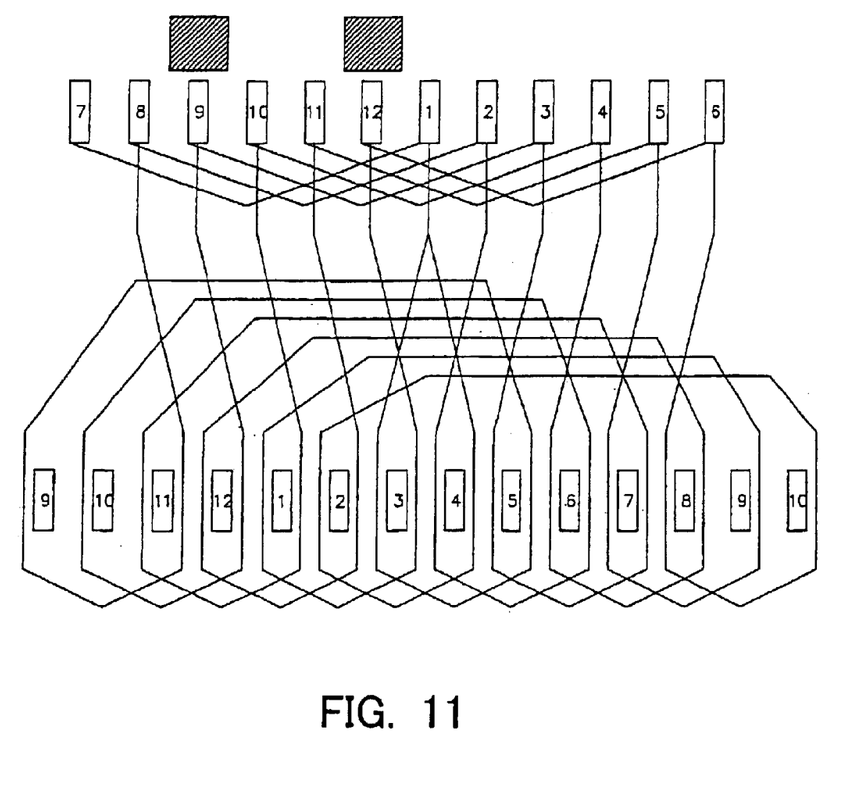
FIG. 11 is configuration of coils for the motor of embodiment 5.

When a motor with this kind of 2-pole brush configuration is used, coils like those in FIG. 11 are one example for a 4-poled motor.

(Modified Example) The abovementioned embodiments are one group of examples of practical forms of the present invention, but many other modified examples can be thought of. For example, in the abovementioned embodiment the anisotropic rare earth bonded magnet 13 was magnetized in a 4-pole configuration, but greater than 4 poles is also acceptable. For example, 6 poles or 8 poles are acceptable. If the number of magnetic poles is increased, the magnetic path length gets shorter and therefore the magnetic flux across the armature coils is increased. Moreover, because it is possible to easily magnetize anisotropic rare earth bonded magnet 13, a higher power, quiet motor can be realized.

Moreover, in the abovementioned embodiment, the anisotropic rare earth bonded magnet 13 is made by resin forming, but it is also acceptable to further process the magnet after resin forming via trimming, etc. for higher precision. With increased dimension precision, a quiet motor without uneven torque is possible.

The present invention has been described in detail with reference to the above embodiments serving as most practical and appropriate examples. However, the present invention is not limited to these embodiments, and appropriate modifications and applications can be made without deviating from the scope of the present invention.

What is claimed is:

1. A DC brush motor comprising:

a housing;

a permanent magnet, having a maximum energy product greater than 14 MGOe, arranged on an inner perimeter of the housing, that is a thin-walled hollow cylinder shaped anisotropic rare earth bonded magnet magnetized with at least 4 magnetic poles; and an electromagnetic rotor core arranged in a center of the DC brush motor, wherein for a motor housing outer diameter, an anisotropic rare earth bonded magnet radial thickness, an electromagnetic rotor core radius and a motor housing thickness, a ratio of the electromagnetic rotor core radius to the motor housing outer diameter is not less than 0.25 and not greater than 0.5, a ratio of the motor housing thickness to the rare earth bonded magnet radial thickness is not less than 1 and not greater than 4, and a ratio of the anisotropic rare earth bonded magnet radial thickness to the motor housing outer diameter is not les than 0.01 and not greater than 0.10.

2. The motor described in claim 1, wherein said ratio of the anisotropic rare earth bonded magnet radial thickness to the motor housing outer diameter is not less than 0.01 and not greater than 0.08.

3. The motor described in claim 1, wherein said ratio of the anisotropic rare earth bonded magnet radial thickness to the motor housing outer diameter is not less than 0.01 and not greater than 0.05.

4. The motor described in claim 1, wherein said ratio of anisotropic rare earth bonded magnet radial thickness to motor housing outer diameter is not less than 0.02 and not greater than 0.05.

5. A permanent magnet that is a thin-walled hollow cylinder shaped anisotropic rare earth bonded magnet magnetized with at least 4 magnetic poles, and that is arranged on an inner perimeter of a housing and around an electromagnetic rotor core, wherein said anisotropic rare earth bonded magnet has a maximum energy product greater than 14 MGOe, for a motor housing outer diameter, an anisotropic rare earth bonded magnet radial thickness, an electromagnetic rotor core radius and a motor housing thickness, a ratio of the electromagnetic rotor core radius to the motor housing outer diameter is not less than 0.25 and not greater than 0.5, and a ratio of the motor housing thickness to the anisotropic rare earth bonded magnet radial thickness is not less than 1 and not greater than 4 and a ratio of the anisotropic rare earth bonded magnet radial thickness to the motor housing outer diameter is not less than 0.01 and not greater than 0.10.

6. The permanent magnet described in claim 5, wherein said ratio of the anisotropic rare earth bonded magnet radial thickness to the motor housing outer diameter is not less than 0.01 and not greater than 0.08.

7. The permanent magnet described in claim 5, wherein said ratio of the anisotropic rare earth bonded magnet radial thickness to the motor housing outer diameter is not less than 0.01 and not greater than 0.05.

8. The permanent magnet described in claim 5, wherein said ratio of the anisotropic rare earth bonded magnet radial thickness to the motor housing outer diameter is not less than 0.02 and not greater than 0.05.

* * * * *